No. 662,529. Patented Nov. 27, 1900.
A. J. FRERKING.
GRAIN UNLOADING DEVICE.
(Application filed May 28, 1900.)
(No Model.)
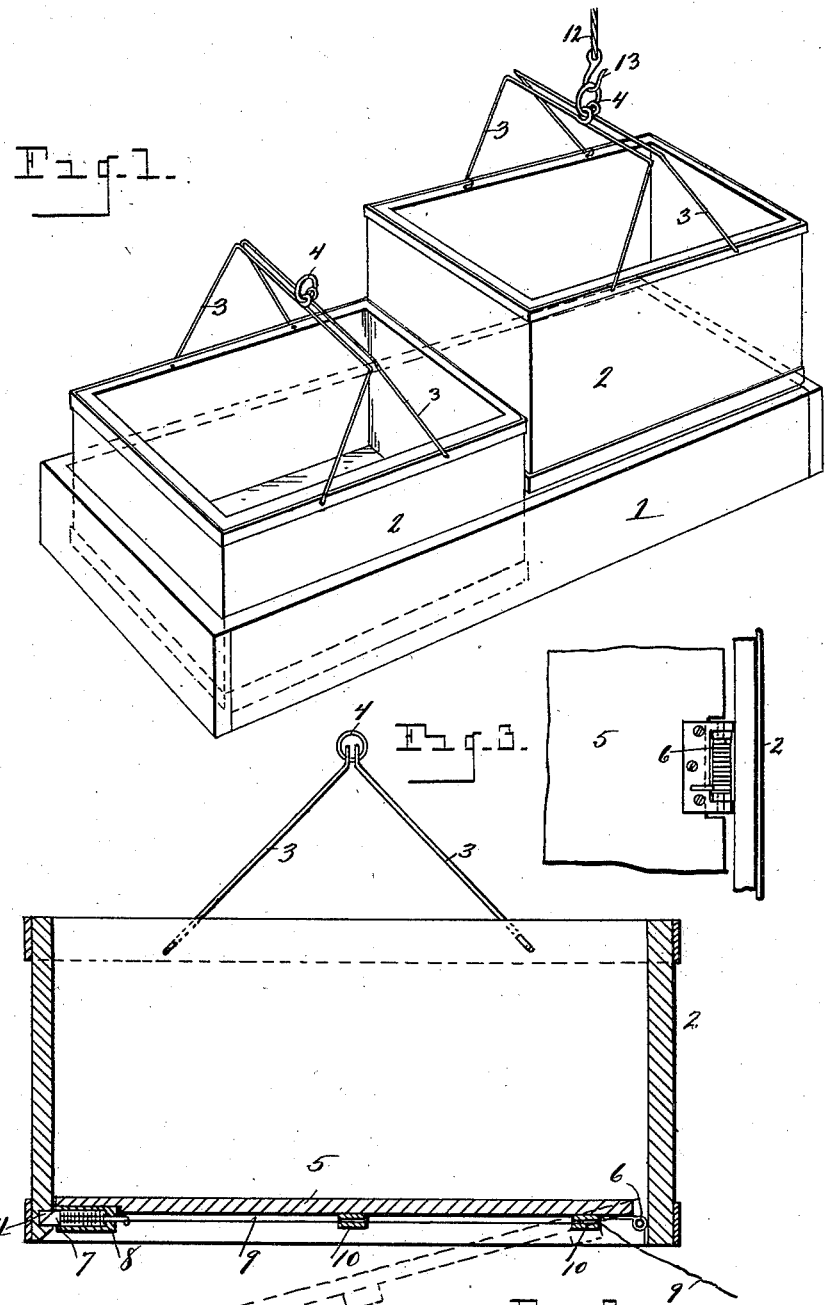
WITNESSES
INVENTOR.
Adolph J. Frerking.
Attorneys.
THE NORRIS PETERS CO., PHOTO-LITHO., WASHINGTON, D. C.

UNITED STATES PATENT OFFICE.

ADOLPH J. FRERKING, OF CONCORDIA, MISSOURI.

GRAIN-UNLOADING DEVICE.

SPECIFICATION forming part of Letters Patent No. 662,529, dated November 27, 1900.

Application filed May 28, 1900. Serial No. 18,341. (No model.)

*To all whom it may concern:*

Be it known that I, ADOLPH J. FRERKING, a citizen of the United States, residing at Concordia, in the county of Lafayette, State of Missouri, have invented certain new and useful Improvements in Grain-Unloading Devices; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to means for unloading corn from the wagon into the granary; and it consists in the construction and arrangement of parts hereinafter fully set forth, and pointed out particularly in the claim.

The object of the invention is to provide simple and efficient means whereby a load of corn when taken to the granary in a wagon may be quickly and easily unloaded, thereby obviating undue handling of the corn and facilitating the operation of placing the corn in the granary. The above object is attained by employing the means illustrated in the accompanying drawings, in which—

Figure 1 is a perspective view of a wagon-box having two of my corn-unloading boxes therein. Fig. 2 is an enlarged vertical longitudinal section through one of the boxes, showing by dotted lines the movement of the hinged bottom. Fig. 3 is a plan view in detail of the bottom, showing the spring-hinge which unites the bottom to the end of the box.

Referring to the characters of reference, 1 designates the wagon-box, and 2 the corn-unloading boxes, which are made of such size as to fit within the wagon-box, as shown, and may be as deep as desired. Secured to the top of each of said boxes are the bails 3, which flare at the bottom and are united at the top by means of the ring 4. The bottom 5 of each box is provided with one or more spring-actuated hinges 6, by means of which the bottom at one end is attached to the end of the box. At the end of the bottom opposite from the hinge is located a spring-actuated locking-bolt 7, which is confined in a suitable housing 8 and to the projecting end of which is attached a cord 9, which passes along the bottom under the cleats 10 in position to be grasped by the operator. A keeper 11 is formed in the end of the box, so as to receive the locking-bolt 7, whereby the bottom is held in place.

It is the purpose to place the boxes in the wagon-box and throw the husked corn therein until said boxes are filled, when the wagon is hauled to the granary, which must be provided with an elevated track (not shown) upon which a pulley-block is adapted to run, through which the cable 12, having the hook 13, is adapted to pass. Said hook is engaged in the ring 4 on the bail and the box hauled up and swung to a position over the granary. Then by pulling the cord 9 the locking-bolt 7 will be withdrawn from its keeper, when the weight of the corn will swing the bottom of the box downwardly upon its hinge and the corn will be discharged from the box into the granary. As the corn passes from the box the spring-hinge will return the bottom to its normal position, when the box may be lowered into the wagon-bed and the contents of the second box discharged into the granary, as described.

Where the granary is located in the barn, the hay-fork track may be employed, and the cable and hook thereof as well, to raise the boxes and carry them to the granary and replace them in the wagon after the contents have been discharged therefrom.

Having thus fully set forth my invention, what I claim as new, and desire to secure by Letters Patent, is—

In a device for the purpose set forth, the combination of a box adapted to contain grain and having a flaring bail whose diverging ends are pivoted to opposite sides of the box to support said box in a horizontal position when elevated, the box having a movable bottom, a spring-actuated hinge attaching the bottom to the box at one end, a spring-actuated locking-bolt mounted on said bottom at the other end thereof, guides on said bottom in alinement with said bolt and a cord attached to said locking-bolt and extending along the bottom of the box through said guides, whereby said bolt may be retracted to unlock the bottom and discharge the contents of the box.

In testimony whereof I sign this specification in the presence of two witnesses.

ADOLPH J. FRERKING.

Witnesses:
HENRY D. FRERKING,
WM. BRUSKMANN.